United States Patent [19]

Nevins et al.

[11] Patent Number: 4,623,677

[45] Date of Patent: * Nov. 18, 1986

[54] SUMMER BLEND CAULKING COMPOSITION

[75] Inventors: Norman Nevins; Thomas L. Gustafson, both of Dayton, Ohio

[73] Assignee: Magic Seal Corporation, Dayton, Ohio

[ * ] Notice: The portion of the term of this patent subsequent to Feb. 18, 2003 has been disclaimed.

[21] Appl. No.: 763,512

[22] Filed: Aug. 8, 1985

[51] Int. Cl.$^4$ .................. C08L 23/08; C08K 5/34; C08K 3/36

[52] U.S. Cl. .................. 523/122; 523/216; 524/100; 524/464; 524/524; 525/222

[58] Field of Search ............... 523/122, 216; 524/100, 524/464, 524; 525/222

[56] References Cited

U.S. PATENT DOCUMENTS

| | | |
|---|---|---|
| 3,868,433 | 2/1975 | Bartz et al. .................. 525/287 |
| 3,896,069 | 7/1975 | Kosaka et al. . |
| 3,914,489 | 10/1975 | Smedberg . |
| 3,926,878 | 12/1975 | Shimizu et al. . |
| 3,932,341 | 1/1976 | Kutch et al. . |
| 3,935,135 | 1/1976 | Dollhausen et al. .................. 524/236 |
| 3,988,276 | 10/1976 | Kutch et al. . |
| 3,991,025 | 11/1976 | Kutch et al. . |
| 4,012,547 | 3/1977 | Smedberg . |
| 4,020,228 | 4/1977 | Eastes .................. 524/549 |
| 4,063,011 | 12/1977 | Campbell et al. . |
| 4,169,822 | 10/1979 | Kutch et al. . |
| 4,204,986 | 5/1980 | Romey et al. . |
| 4,309,332 | 1/1982 | Fischer et al. . |
| 4,338,227 | 7/1982 | Ballard . |
| 4,358,557 | 11/1982 | Boggs . |
| 4,379,190 | 4/1983 | Schenck . |
| 4,482,609 | 11/1984 | Woodhouse .................. 524/89 |
| 4,571,410 | 2/1986 | Nevins et al. .................. 524/524 |

OTHER PUBLICATIONS

Handbook of Adhesives (2nd Ed.), "Caulks and Sealants," pp. 708–709.

*Primary Examiner*—Herbert J. Lilling
*Attorney, Agent, or Firm*—Killworth, Gottman, Hagan & Schaeff

[57] ABSTRACT

A summer blend, solvent-based, clear caulking composition having as a primary polymer an ethylene vinyl acetate copolymer having a 40–52% vinyl acetate content. Other ingredients in the improved caulking composition include a water white styrenic hydrocarbon resin, thickening agents, and an organic solvent. Optional components include plasticizers, bactericides, antioxidants, U.V. light stabilizers, pigments and dyes, etc. The resulting caulk has excellent pumpability, slump control, and weatherability at the temperature of use.

17 Claims, No Drawings

SUMMER BLEND CAULKING COMPOSITION

BACKGROUND OF THE INVENTION

The present invention relates to sealer compositions and more particularly it relates to a solvent-based, clear caulking composition having improved caulking characteristics.

Many types of adhesives, sealants, caulking compositions and the like have been developed heretofore and are discussed at length in the book entitled *Sealants* by Adolfos Damusis published in 1967 by Reinhold Publishing Company. Many of these compounds are solvent-based ones. See also the *Handbook of Adhesives* (2nd ed.) chapter entitled "Caulks and Sealants", pages 708–709 wherein the "best" of the solvent based sealants, namely silicones, are discussed. However, as pointed out, even silicone sealants have certain drawbacks. Silicone sealants are translucent/opaque rather than clear, they must be protected from moisture during manufacture and storage, and many silicone sealants on cure either evolve acetic acid (which is corrosive and has an objectionable odor) or they must be specially compounded to avoid that problem.

In addition, solvent-based sealants during gradual release of the solvent undergo a shrinkage of the material and/or sagging of the material (termed "slump" in the trade) prior to its having set-up. This is objectionable in many situations.

For that reason Kutch et al, among others, suggest use of hot melt sealants instead. Thus, in U.S. Pat. No. 4,169,822, Kutch et al disclose solvent-free hot melt caulking compositions which are sufficiently soft or fluid at a temperature above about 150° F. to permit them to be readily applied in use and which harden upon cooling without solvent release. The caulking compositions of Kutch et al contain elastomeric polymers such as butyl rubbers, tackifying resins such as terpene resins, and adhesion promoters which may include ethylene vinyl acetate copolymers. See also U.S. Pat. Nos. 3,991,025; 3,988,276, and 3,392,341 for other references to ethylene vinyl acetate containing hot melt caulking compositions.

Even though hot melt caulking compositions avoid for the most part the problems of slump control, other problems exist. For example, hot melt adhesives must, as mentioned, be applied "hot" (i.e. see the Kutch et al requirement that the hot melt adhesives be applied at temperatures between 150°–375° F.) This requires that special heated applicator equipment be readily available. Other disadvantages to hot melt caulking compositions are potential degradation of the caulk and other problems causing because of its temperature dependence. Because hot melt caulking compositions are organic in nature and are applied at elevated temperatures there is the potential for discoloring, viscosity increases, and skinning since such ingredients may be subject to change in their molten state. Likewise, because the materials must of necessity be temperature dependent care must be taken to ensure proper wetting and subsequent adhesion at all use temperatures.

Accordingly, a solvent-based caulking composition would be desirable if the slump problems could be controlled. In our copending application Ser. No. 699,177 filed Feb. 7, 1985, now U.S. Pat. No. 4,571,410, the disclosure of which is incorporated herein by reference, there is disclosed an improved solvent-based caulking composition which meets that need.

The caulking composition of our copending application contains a blend of highly weather resistant copolymers, resins and plasticizers so as to provide excellent indoor and outdoor caulking performance. The caulking composition applies easily, i.e. it applies "string free" and is easily tooled. The caulking composition can be applied under varying weather conditions including high humidity, moderately cold and warm conditions. Thus, it has many of the advantages of silicone sealants at a fraction of the cost. In addition, its clarity, non-corrosive characteristics and lack of moisture sensitivity make it superior to silicone sealants in many instances.

Still, that composition requires a unique blend of ethylene vinyl acetate copolymers having different vinyl acetate contents. In certain instances where temperature conditions do not vary significantly (i.e. in the tropics) or when the caulk is to be used only during the summer time, such delicate blends are not required. Accordingly, it would be desirable to use a less complex and less expensive caulking composition for those uses and climates.

SUMMARY OF THE INVENTION

The present invention meets that need by providing a solvent-based, clear caulking composition containing a "summer blend" of materials. Within its temperature use range (i.e. between 60° F. and 100° F.) it provides excellent indoor and outdoor caulking performance. Like the caulking composition of our copending application, the present caulking composition applies easily, i.e. it applies "string free" and is easily tooled. It also adheres well to a variety of building materials, has little slump so as to be essentially non-sagging, and it becomes tack-free quickly so that dirt pick-up is eliminated. It is paintable.

The caulking composition of the present invention preferably has the following approximate weight percentages:
- 50–60% solvent,
- 13–45% ethylene vinyl acetate copolymer having a 40–52% vinyl acetate content,
- 8–16% water white hydrocarbon resin,
- 4–6% thickening agent,
- 0–2.4% plasticizer,
- 0–2.5% bactericide, and
- 0–0.25% antioxidant/U.V. light stabilizer The solvent may be any one of a number of hydrocarbons which rapidly evaporate at operating temperature and impart quick skinning characteristics to the caulking composition. Preferably it is a blend of chlorinated hydrocarbons, mineral spirits and toluol. The preferred chlorinated hydrocarbon is an inhibited grade, non-flammable one which inhibits corrosion of the metal parts of any mixing equipment and which contributes to the quick skinning characteristics of the caulk. The mineral spirits may be typical high-flash hydrocarbons having a low (less then 7%) aromatic content. The toluol, on the other hand, is an aromatic solvent which also contributes to quick skinning and hastens the solubilization of the polymers.

The preferred solvent blend of chlorinated hydrocarbons, mineral spirits and toluol insures good solubilization of the polymers, good drying characteristics, and a flash point above 100° F. Also, this blend maintains good clarity as the solvent evaporates.

The primary polymer of the system is the ethylene vinyl acetate copolymer having a 40–52%, and most preferably a 45%, vinyl acetate content. A 45% vinyl acetate, 55% polyethylene copolymer provides good pumpability at temperatures in the range of 60° F. to 100° F.

The preferred water white hydrocarbon resin is an alpha-methyl styrene based one produced by polymerization of pure feed stocks and hydrogenation to a 33 percent level. It is highly stable, has a low molecular weight, and is a non-polar resin having good U.V. light stability.

The thickening agent may be any number of known fillers which are clear, thicken and aid in slump control. The preferred thickening agent is a fumed silica having a refractive index compatible with the other ingredients so as to maintain the clarity of the caulking composition. Most preferably, a glycol is added to couple with the fumed silica and provide a good gel structure which helps prevent slump on vertical surfaces.

A plasticizer may be added, as needed, to enhance low temperature flexibility, improve wetting and adhesion, enable increased solids content, etc. all known plasticizer functions. Preferred amongst the plasticizers are the benzoic acid derivatives such as glycol and polyglycol mono-, di- and tri-benzoates. Other plasticizers which may be used include dioctyl sebacate, butyl benzyl phthalate, tri(2-ethylhexyl)trimellitate, dibutoxyethyl adipate, and di-2-ethyl-hexyl azelate.

Other optional ingredients are: (1) a bactericide such as clear antimicrobial agent which will provide long-term protection against bacterial and fungal attack and helps prevent surface growth, staining, embrittlement, and premature product failure; (2) an antioxidant such as a phenol or polyphenol to help prevent premature degradation of the copolymers, resin and plasticizer during processing and after application, and (3) a U.V. light stabilizer such as a benzotriazole or substituted benzotriazole. The antioxidant and U.V. light stabilizer are preferably combined to provide maximum weathering retention properties.

In addition to these preferred optional ingredients, others may be used under certain circumstances. For example, if it is desirable to tint the caulking composition, an appropriate pigment or dye (i.e. one having good U.V. light stability) may be added. Likewise, a silane adhesion promoter may be added if wet application or application to glass is likely. Yet others will readily occur to one of ordinary skill in the art.

The result is a caulking composition that is: clear, non-stringy (easy to apply); non-slump (making it applicable to vertical surfaces); good skinning such that it will not collect dirt and become discolored; adherent to building surfaces such as wood, metal and glass; mildew resistant; paintable; inexpensive; weatherable within the temperature range of use; resealing; and applicable in layers. It may be used in any number of sealing situations, including: sealing around doors and windows; sealing around air conditioning units; sealing around flashings; sealing around patio doors and enclosures; sealing aluminum siding joints; weatherproofing gutters; sealing eaves and vents; as a bathroom caulk for sealing around sinks, tubs, and shower stalls; and sealing boats (and other marine structures), trailers, mobile homes, and other metal structures.

Accordingly, it is an object of the present invention to provide a summer blend, solvent-based, clear caulking composition. Other objects and advantages of the invention will be apparent from the following description and the appended claims.

DETAILED DESCRIPTION OF THE PREFERRED EMBODIMENTS

As mentioned, the primary polymer of the present caulking composition is an ethylene vinyl acetate copolymer having a 40–52% vinyl acetate content. Since this is the primary polymer, in discussing the most preferred embodiment it is convenient to set forth the composition in parts by weight with the primary polymer being fixed at 100 parts and the remaining components varying relative thereto. Thus, the preferred caulking composition in approximate parts by weight is:

100 parts ethylene vinyl acetate copolymer having a 40–52% vinyl acetate content,
35–65 parts water white hydrocarbon resin,
17–25 parts thickening agent
0–10.0 parts plasticizer,
0–10 parts bactericide,
0–2.0 parts antioxidant/U.V. light stabilizer, and
200–250 parts solvent.

The preferred primary polymer is Vynathene EY 903-00 from U.S. Industrial Chemicals, Cincinnati, Ohio. Alternatively Vynathene EY 903-25, from the same source, may be used. Both Vynathene EY 903-00 and Vynathene EY 903-25 have approximately a 45% vinyl acetate content. Another alternative is Vynathene EY 904-00 from U.S. Industrial Chemicals. It has a vinyl acetate content of 51%. At the other end of the range one may use Vynathene EY 902-00, from U.S. Industrial Chemicals or Elvax 40 from Dupont DeNemours & Co. having approximately a 40% vinyl acetate content.

The preferred water white hydrocarbon resin is Regalrez 3102 from Hercles, Inc. Preferably it is present in the range of 35–65 parts/100 parts of primary polymer, and most preferably about 50 parts are added. Addition of over about 75 parts renders the caulking composition milky white and detracts from its clarity and, thus, is to be avoided if a clear caulk is being sought.

The amount of thickening agent used may vary depending on the viscosity sought and the amount of solvent present. Generally, it has been found that 17–25 parts is a practical range. It has also been found that a filler prepared from the combination of a fumed silica, such as Cab-O-Sil M5 from Cabot Corporation, and a glycol, such as Pluronic L61 from BASF Wyandotte, is particularly advantageous. The fumed silica is added in the range of 16–22 parts. The glycol is then added at 4–8% of the level of fumed silica or approximately 0.65–1.6 parts per 100 parts of primary polymer. This combination results in formation of a filler gel structure which is particularly advantageous in preventing slump on vertical surfaces and otherwise gives optimum performance for the caulk.

Likewise, the preferred amount of plasticizer for optimum performance is 5–10 parts for each 100 parts of primary polymer if a plasticizer is used at all. Most preferred around 7 parts of a benzoic acid derivative plasticizer such as Benzoflex 284 from Velsicol Chemical Corp. of Chicago, Ill. Other glycol or polyglycol mono-, di-, or tri-benzoates may be used.

The preferred amount of bactericide present is 0.5–10.0 parts, with the lower levels being most preferred as long as it is sufficient to add the desired amount, if any, of antimicrobial activity. Preferred is a plasticizer compatible antimicrobial agent such as Vinyzene BP5-2MS from Ventron Div. of Morton Thiokol, Inc. Danvers, Mass.

The preferred combined amount of antioxidant/U.V. light absorber is 0.25–1 parts, with the most preferred being about 0.25 parts of a polyphenol antioxidant such as Irganox 1010 from Ciba-Geigy Corp. and about 0.25 parts of a benzotriazole U.V. light stabilizer such as Tinuvin P, also from Ciba-Geigy. Irganox 1010 is tetrakis(methylene 3-(3',5'-di-tert-butyl-4'-hydroxyhydrohydroxycinnamate)methane and Tinuvin P is 2(2'hydroxy-5'methylphenyl)benzotriazole. Other non-staining, non-discoloring, lower water solubility antioxidants and U.V. light stabilizers may be used.

Finally, the solvent may be present preferably in the 200–250 parts range. This can be adjusted depending on the viscosity of the caulk. As mentioned, the preferred solvent is a blend of chlorinated hydrocarbon such as Perchloroethylene SVG from Diamond Shamrock Chemical Company, mineral spirits such as Rule 66 mineral spirits from Getty Oil Company and toluol which may be obtained from Sun Chemical Company, amongst others.

The following non-limiting examples are illustrative of the most preferred caulking composition:

EXAMPLE

The ingredients in the pound amounts listed were blended in the following order of addition:

|  | Lbs/Batch | % | Parts |
|---|---|---|---|
| Chlorinated Hydrocarbon (Perchloroethylene SVG) | 1455.0 | 33.12 | 132.3 |
| Mineral Spirits, Rule 66 | 596.0 | 13.56 | 54.8 |
| Toluol | 382.0 | 8.69 | 34.73 |
| Water White Hydrocarbon Resin (Regalrez 3102) | 550.0 | 12.52 | 50.00 |
| Irganox 1010 Antioxidant | 2.75 | 0.06 | 0.25 |
| Tinuvin P U.V. Light Stabilizer | 2.75 | 0.06 | 0.25 |
| Vinyzene BP5-2MS Bactericide | 5.50 | 0.12 | 0.50 |
| Vynathene EY 903-00 (EVA) | 1100.0 | 24.17 | 100.00 |
| Plasticizer (Benzoflex 284) | 73.0 | 1.68 | 6.64 |
| Cab-O-Sil M5 (fumed silica) | 210.0 | 4.83 | 19.09 |
| Pluronic L61 (glycol) | 17.0 | 0.39 | 1.55 |
|  | 4,391.00 | 99.20 | 400.11 |

The resulting clear caulking composition was tested for its caulking characteristics and it was found to have excellent pumpability in the temperature range of 60° F. to 100° F.; excellent slump control; good skinning characteristics; and excellent weatherability at the temperatures of use.

While the composition described herein constitutes a preferred embodiment of the invention it is to be understood that the invention is not limited to this precise composition and that changes may be made therein without departing from the scope of the invention, which is defined in the appended claims.

What is claimed is:

1. A solvent-based, clear caulking composition adapted to be applied at temperatures between about 60° to about 100° F. consisting essentially of by weight approximately:
   50–60% solvent,
   13–45% ethylene vinyl acetate copolymer having a 40–52% vinyl acetate content,
   8–16% water white hydrocarbon resin,
   4–6% thickening agent,
   0–2.4% plasticizer,
   0–2.5% bactericide, and
   0–0.25% antioxidant/U.V. light stabilizer.

2. The solvent-based, clear caulking composition of claim 1 wherein said thickening agent is a combination of a fumed silica which has a refractive index compatible with the other ingredients so as to maintain the clarity of said caulking composition, and a glycol which couples with said fumed silica to provide a good gel structure.

3. The solvent-based, clear caulking composition of claim 2 wherein said solvent is a blend of chlorinated hydrocarbons, mineral spirits, and toluol.

4. The solvent-based, clear caulking composition of claim 3 wherein said plasticizer is a benzoic acid derivative.

5. The solvent-based, clear caulking composition of claim 3 wherein said antioxidant/U.V. light stabilizer is a combination of an antioxidant selected from the group consisting of phenols and polyphenols and a benzotriazole U.V. light stabilizer.

6. The solvent-based, clear caulking composition of claim 5 wherein said antioxidant is tetrakis(methylene(3',5'-di-tert-butyl-4'-hydroxyhydrocinnamate)methane and said U.V. light stabilizer is 2(2'hydroxy-5'-methylphenyl)benzotriazole.

7. The solvent-based, clear caulking composition of claim 5 wherein said water white hydrocarbon resin is an alpha-methyl styrene based one.

8. The solvent-based, clear caulking composition of claim 7 consisting essentially of:
   56% solvent
   25% ethylene vinyl acetate copolymer having a 45% vinyl acetate content,
   13% water white hydrocarbon resin
   5% thickening agent,
   2% plasticizer,
   0.06% antioxidant
   0.06% U.V. light stabilizer, and
   0.1% bactericide 9. A solvent-based, clear caulking composition adapted to be applied at termperatures between about 60° to about 100° F. consisting essentially of by weight approximately:
   100 parts ethylene vinyl acetate copolymer having a 40–52% vinyl acetate content,
   35–65 parts water white hydrocarbon resin,
   17–25 parts thickening agent,
   0–10.0 parts plasticizer,
   0–10.0 parts bactericide
   0–0.20 parts antioxidant/U.V. light stabilizer, and
   200–250 parts solvent.

10. The solvent-based, clear caulking composition of claim 9 wherein said ethylene vinyl acetate copolymer having a 40–52% vinyl acetate content has a 45% vinyl acetate content.

11. The solvent-based, clear caulking composition of claim 10 wherein said solvent is a blend of approximately 132 parts chlorinated hydrocarbon, 54 parts mineral spirits, and 35 parts toluol.

12. The solvent-based, clear caulking composition of claim 10 wherein said water white hydrocarbon resin is present in the range of 50–55 parts.

13. The solvent-based, clear caulking composition of claim 10 wheren said antioxidant is a polyphenol present in the amount of approximately 0.25 parts and said U.V. light stabilizer is a benzotriazole present in the amount of approximately 0.25 parts.

14. The solvent-based, clear caulking composition of claim 10 wherein said thickening agent is a combination of a fumed silica which has a refractive index compatible with the other ingredients so as to maintain the clarity of said caulking composition, and a glycol which couples with said fumed silica to provide a good gel structure.

15. The solvent-based, clear caulking composition of claim 10 wherein said plasticizer is a benzoic acid derivative present in the amount of approximately 7 parts.

16. The solvent-based, clear caulking composition of claim 10 wherein said bactericide is a clear antimicrobial agent compatible with said plasticizer.

17. A solvent-based, clear caulking composition consisting essentially of approximately:
- 100 parts ethylene vinyl acetate copolymer having a 45% vinyl acetate content,
- 50 parts water white hydrocarbon resin,
- 0.25 parts polyphenol antioxidant
- 0.25 parts benzotrizole U.V. light stabilizer,
- 21 parts fumed silica/glycol mixture as a thickening agent,
- 0.5 parts clear antimicrobial agent,
- 7 parts benzoic acid derivative plasticizer, and
- 221 parts solvent blend of chlorinated hydrocarbons, mineral spirits, and toluol.

* * * * *